United States Patent [19]
Mellen

[11] Patent Number: 5,145,496
[45] Date of Patent: Sep. 8, 1992

[54] CENTRIFUGAL AIR CLEANER

[76] Inventor: Floyd F. Mellen, 8417 Pacific St., Omaha, Nebr. 68114

[21] Appl. No.: 778,306

[22] Filed: Oct. 16, 1991

[51] Int. Cl.⁵ .............................................. B01D 46/04
[52] U.S. Cl. ....................................... 55/188; 55/213; 55/302; 55/337; 55/429; 55/472; 55/DIG. 20
[58] Field of Search .................. 55/186, 188, 213, 302, 55/337, 429, 471, 472, 498, 521, DIG. 20; 110/119, 216, 217; 431/346

[56] References Cited

U.S. PATENT DOCUMENTS

| | | | |
|---|---|---|---|
| 293,445 | 2/1884 | Frick | 55/DIG. 20 X |
| 3,654,748 | 4/1972 | Bloom | 55/322 |
| 3,715,871 | 2/1973 | Jones et al. | 55/DIG. 20 X |
| 4,144,043 | 3/1979 | Johnston | 55/319 |
| 4,174,204 | 11/1979 | Chase | 55/472 X |
| 4,253,855 | 3/1981 | Jackson et al. | 55/302 X |
| 4,268,289 | 5/1981 | Polaner | 55/486 |
| 4,350,280 | 9/1982 | Kruse | 228/29 |
| 4,358,300 | 11/1982 | Schlapman et al. | 55/DIG. 20 X |
| 4,655,805 | 4/1987 | Krantz | 55/298 |
| 4,680,039 | 7/1987 | Revell | 55/429 X |
| 4,995,137 | 2/1991 | Reichborn | 15/327.1 |
| 5,002,049 | 3/1991 | Knoll | 128/200.28 |
| 5,013,438 | 5/1991 | Smith | 210/455 |

FOREIGN PATENT DOCUMENTS

197710 10/1977 U.S.S.R. .

*Primary Examiner*—Charles Hart
*Attorney, Agent, or Firm*—John A. Beehner

[57] ABSTRACT

A centrifugal air cleaning apparatus includes a housing defining a filter compartment containing a generally tubular filter cartridge having the open upper end thereof in communication with an air outlet opening through the top wall of the filter compartment. A vacuum source is provided in communication with that air outlet opening to effect vacuum pressure within the filter compartment. An air inlet opening through a side wall of the filter compartment has a multi-baffled flame arrestor associated therewith for extinguishing sparks in the fumes being drawn into the filter compartment and for directing the incoming air flow tangentially of the filter cartridge so that a portion of the pollutants carried in the fumes are separated by gravity before the fumes contact the filter cartridge. An injector conduit is provided within the flame arrestor to facilitate blowdown. A precoat feed conduit is supported in the filter compartment in upright spaced relation from the filter cartridge and has a plurality of vertically spaced outlet ports facing the cartridge for uniform distribution of precoat material under the filter cartridge. Efficient blowdown of the filter cartridge is accomplished by a diffuser hose extending downwardly through the filter cartridge, which hose has a plurality of vertically and circumferentially spaced apart outlet ports for directing multiple blasts of air radially outwardly from the hose along the full extent of the height of the filter cartridge. Collected dust is removable from the filter compartment either by a removable dust collection pan or automatically by an eductor associated with a hopper baffle at the base of the filter compartment.

33 Claims, 6 Drawing Sheets

CENTRIFUGAL AIR CLEANER

BACKGROUND OF THE INVENTION

The present invention is directed generally to a centrifugal air cleaner and more particularly to such a device for efficiently extracting pollutants from an air stream, such as weld smoke.

Heavily polluted air such as weld smoke can relatively quickly clog conventional air filters thereby requiring frequent, and therefore costly, filter replacement.

Other problems associated with the use of conventional air cleaners for weld smoke include the probability of holes being burned through the flame resistant treated paper filter cartridge by burning sparks carried within the weld smoke.

Filter cartridges are often coated with a precoat material to decrease the adhesion of pollutants to the filter cartridge. Such precoat material is generally introduced into the filter compartment through a single opening with the result that the portion of the filter closest to the opening is heavily coated and portions of the filter spaced further from the opening may remain uncoated.

Replaceable filter cartridges may be reusable by performing a blowdown operation wherein a blast of reverse air flow blows pollutants from the exterior surface of the filter cartridge. Conventional air cleaners accomplish this blowdown operation by directing a blast of pressurized air into the interior of a filter cartridge from a single discharge port so that portions of the filter are cleaned to a greater extent than other portions. A downward blast of air into an upright tubular cartridge will tend to clean the lower end of the cartridge better than the upper end, for example.

Finally, the removal of pollutants from an air cleaner can be a cumbersome and messy operation. No welder wishes to end his work day with a task that results in himself and his clothing being soiled.

Accordingly, a primary object of the invention is to provide an efficient centrifugal air cleaner for extracting pollutants from an air stream, such as weld smoke.

Another object is to provide such an air cleaner wherein much of the pollutants are separated from the air stream without contacting being the filter cartridge.

Another object is to provide such an air cleaner including a flame arrestor for extinguishing sparks prior to their contact with the filter cartridge.

Another object is to provide such an air cleaner with a device for cleaning the flame arrestor without removing it from the air cleaner.

Another object is to provide such an air cleaner with structure for uniformly coating a tubular filter cartridge with precoat material.

Another object is to provide a centrifugal air cleaner with apparatus for accomplishing a thorough and generally uniform blowdown of a tubular filter cartridge along the full length of the cartridge.

Another object is to provide a centrifugal air cleaner with structure for quickly and easily removing pollutants collected therein.

Another object is to provide such an air cleaner with a system for automatically removing pollutants to a waste receptacle with no manual contact with the pollutants.

Another object of the invention is to provide a centrifugal air cleaner which is operative to clean polluted air streams from multiple sources such as the weld smoke from a plurality of welders.

Finally, an object of the invention is to provide a centrifugal air cleaner which is simple and rugged in construction, economical to manufacture and efficient in operation.

SUMMARY OF THE INVENTION

The centrifugal air cleaning apparatus of the present invention includes a housing defining a preferably upright filter compartment having an air outlet opening through the top wall thereof. A vacuum source in communication with the air outlet opening draws air from the filter compartment. A tubular filter cartridge is mounted in the filter compartment with the bottom end of the cartridge closed and the upper end in communication with the air outlet opening so that air flow through the cartridge is directed through the air outlet opening. The filter compartment has an air inlet opening through one of the peripheral side walls, which opening is designed to direct air into the filter compartment generally tangentially of the filter cartridge to effect centrifugal air flow within the filter compartment. The collisions of pollutants with the side walls of the filter compartment cause much of the pollutants to separate from the air stream by gravity without contacting the filter cartridge. The useful life of the cartridge is prolonged since its function is reduced to removing only the remaining portion of pollutants still carried by the air stream as it contacts the filter.

A flame arrestor may be provided for extinguishing sparks carried within weld smoke conveyed to the air inlet opening. The flame arrestor has a plurality of flow diverting surfaces which may take the form of a series of parallel spaced apart baffles extending from opposite sides of the flame arrestor chamber in overlapped relation somewhat like an automobile muffler. The useful life of the filter cartridge is thus extended by preventing premature failure due to burn holes through the cartridge. The air inlet opening is preferably transversely offset from the center of a side wall and the discharge opening from the flame arrestor is likewise designed to effect tangential flow of air into the filter compartment.

Since the interior of the flame arrestor chamber may be inaccessible, effective cleaning of the chamber is accomplished by providing a flame arrestor blowdown system including an injector conduit having an inlet end accessible exteriorly of the air cleaner and adapted for connection to a source of pressurized air, and an outlet end disposed within the flame arrestor for directing a blast of air therethrough to clean pollutants from the interior surfaces thereof.

A precoat feed conduit is supported in generally upright relation adjacent the filter compartment side wall and has a plurality of vertically spaced apart outlet ports facing the filter cartridge. The inlet end of the precoat feed conduit is arranged exteriorly of the filter compartment, such that upon immersion of the inlet end in precoat material, vacuum pressure from the vacuum source draws precoat material through the precoat feed conduit outlet ports toward the filter cartridge at a plurality of vertically spaced apart positions thereon for substantially uniform coating of the entire exterior surface of the filter cartridge.

To prolong the useful life of a filter cartridge, the centrifugal air cleaner includes a filter cartridge blowdown apparatus having an elongated diffuser hose suspended in upright relation in the filter compartment in registration with the top wall air outlet opening so as to be disposed interiorly of a tubular filter cartridge mounted therein. The diffuser hose has a plurality of vertically and circumferentially spaced apart outlet ports so that upon connection of the upper end of the diffuser hose to a source of pressurized air, it directs blasts of air generally radially outwardly from the outlet ports to blowdown the entire surface of the filter cartridge.

To facilitate removal of collected pollutants from the air cleaner, a dust collection pan may be provided below the filter cartridge. Downwardly and interiorly inclined baffles on the filter compartment side walls direct dust falling by gravity in the filter compartment into the dust collection pan which may be removable through a side wall access door for periodic emptying. In the alternative, the bottom wall of the filter compartment may take the form of a hopper baffle converging downwardly toward a discharge opening connected to a generally tubular eductor such that upon connection of one end of the eductor to a source of pressurized air, pollutants are drawn from the hopper for discharge through the opposite end of the eductor. That opposite end may be connected by a hose to a separator tank for removal of pollutants with no manual contact with the collected dust or pollutants.

DESCRIPTION OF A PREFERRED EMBODIMENT

Figure 1:
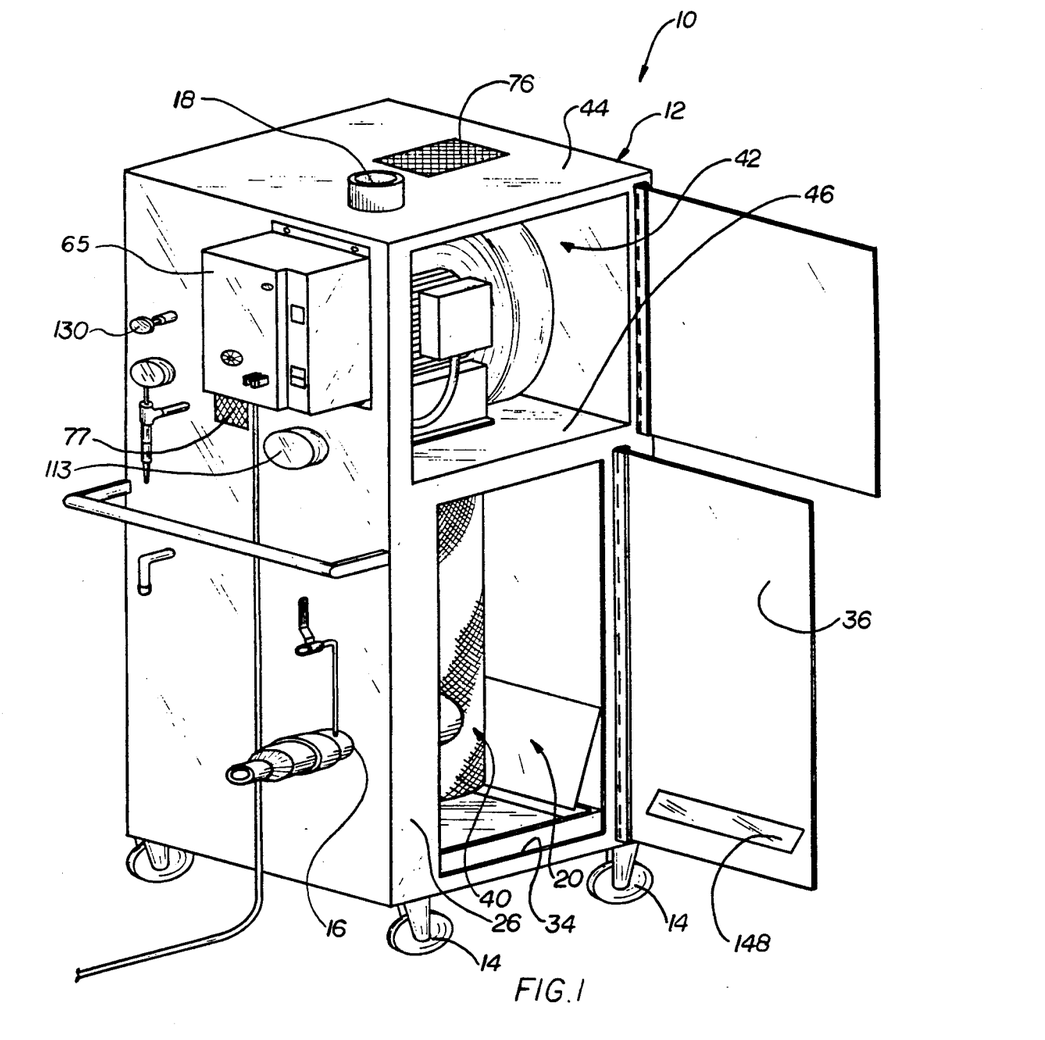
FIG. 1 is a perspective view of the centrifugal air cleaner of the invention.

The centrifugal air cleaning apparatus 10 of the present invention is illustrated in FIG. 1 as including a housing 12 movably supported on wheels 14 and including an air inlet opening 16 through one side wall and an air outlet 18 through the top of the housing.

Housing 12 defines a lower filter compartment 20 having a top wall 22 (FIG. 8), a bottom wall 24 (FIG. 9) and peripheral side walls including front wall 26, rear wall 28 and opposite walls 30 (FIG. 7) and 32. Front wall 26 may have a large access opening 34 (FIG. 5) which can be closed by a hinged door 36. A tubular filter cartridge 40 is mounted within filter compartment 20 as described below.

Figure 8:
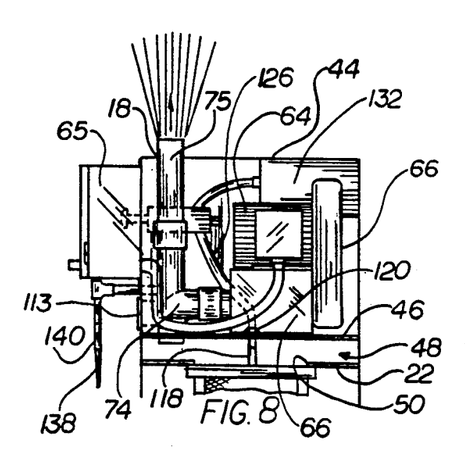
FIG. 8 is a front sectional view taken along line 8—8 in FIG. 6, showing the elements within the motor compartment and intermediate chamber.

Housing 12 may further define an upper motor compartment 42 above the filter compartment 20. The motor compartment 42 is defined by the same peripheral side walls but is closed on the top and bottom by a top wall 44 and a blower base 46. It is seen in FIG. 8 that a relatively shallow space between the filter compartment top wall 22 and blower base 46 affords an intermediate chamber 48.

Figure 7:
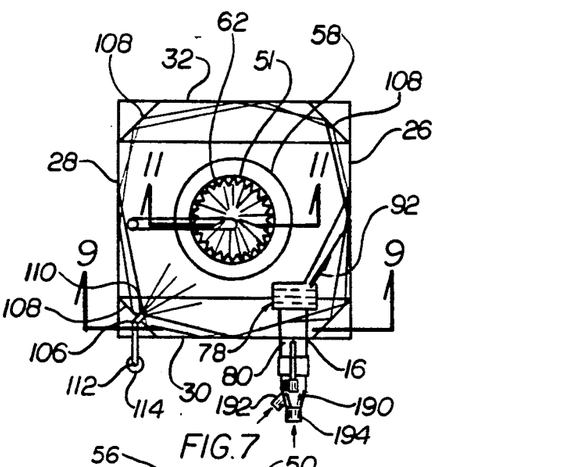
FIG. 7 is a top sectional view taken along line 7—7 in FIG. 4 showing the contents of the lower filter compartment.
Figure 9:
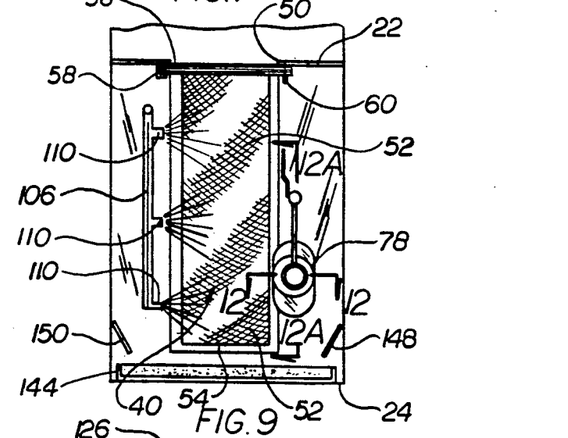
FIG. 9 is a side sectional view taken along line 9—9 in FIG. 7, showing the filter compartment.

Referring to FIGS. 7 and 9, the filter compartment top wall 22 has a large air outlet opening 50 preferably centered thereon.

Figures 10, 11:
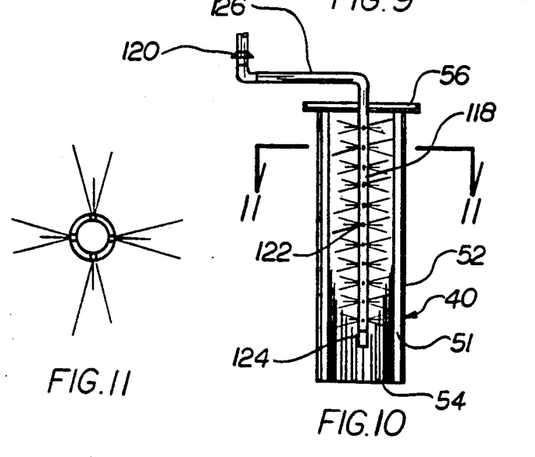
FIG. 10 is a sectional view through a filter cartridge showing the diffuser hose of the filter cartridge blowdown apparatus.
FIG. 11 is a top sectional view of the filter cartridge blowdown diffuser hose, taken along line 11—11 in FIG. 10.

Tubular filter cartridge 40 preferably comprises an elongated upright cylindrical side wall 51 of multi-folded flame resistant treated paper (FIGS. 7 and 10), perhaps enclosed within a cylindrical screen 52 for structural support and protection of the paper filter element 51. Cartridge 40 is preferably closed at the bottom by a bottom wall 54 and attached to a rectangular mounting collar 56 at the top. Collar 56 may rest within a pair of transversely spaced apart support brackets 58 (FIG. 9) along the rearward edge with the front edge secured to the top wall by a removable thumbscrew 60. The tubular filter cartridge is thus sealed to the top wall 22 so that all air flow through the open upper end 62 (FIG. 7) of the filter cartridge 40 is directed through the air outlet opening 50 through top wall 22.

Figure 6:
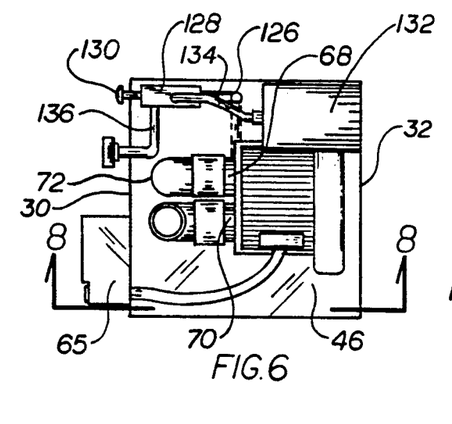
FIG. 6 is a top sectional view taken along line 6—6 in FIG. 4 showing the interior of the motor compartment.

Motor compartment 42 contains a conventional vacuum blower motor 64, such as a TEFC motor, operatively connected to a blower 66 which includes an air inlet port 68 and an air outlet port 70 (FIG. 6). Air inlet port 68 is connected by an appropriate elbow fitting 72 to the intermediate chamber 48 for drawing air therefrom. Outlet port 70 is connected by elbow fitting 74 and conduit 75 (FIG. 8) to the air outlet 18 for exhausting air to the ambient atmosphere exteriorly of motor compartment 42.

Figure 2:
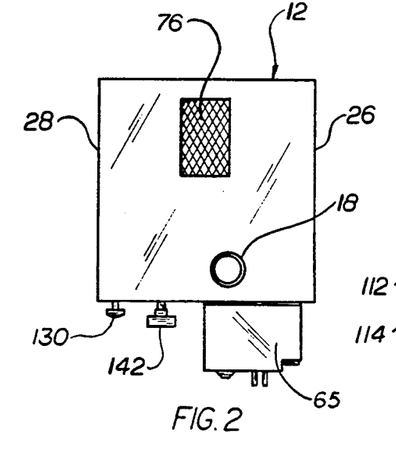
FIG. 2 is top plan view thereof.
Figure 3:
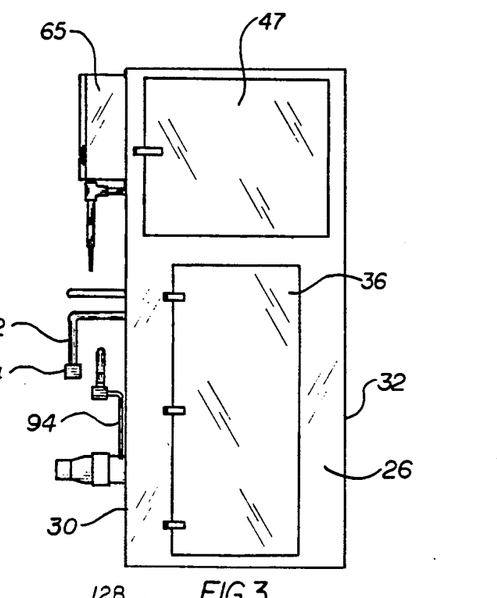
FIG. 3 is a front elevational view thereof.
Figure 4:
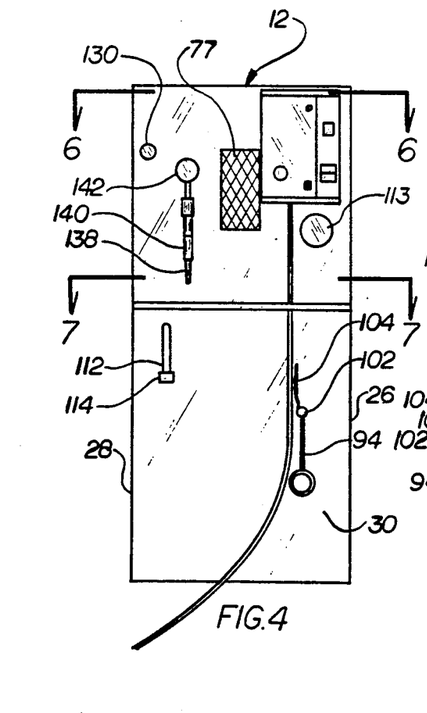
FIG. 4 is a side elevational view thereof.

Thus filtered air is discharged through the top of the housing to the ambient atmosphere rather than into the motor compartment. A pair of vents 76 and 77 shown in FIGS. 1, 2 and 4 afford ample ventilation for the totally enclosed fan cooled motor 64 within motor compartment 42.

As shown best in FIG. 7, suction through filter cartridge 40 causes air to be drawn into filter compartment 20 through air inlet opening 16. Opening 16 is preferably transversely offset from the center of side wall 30 to help facilitate centrifugal flow of air within filter compartment 20.

Figure 12:
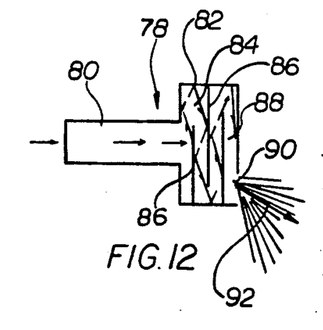
FIG. 12 is a top sectional view through the flame arrestor, taken along line 12—12 in FIG. 9.
Figure 12A:
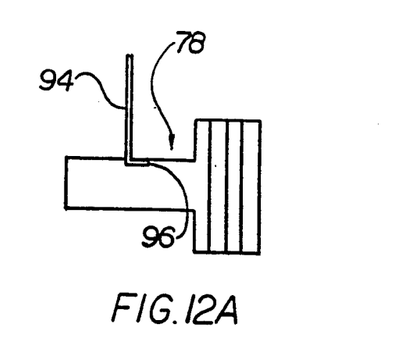
FIG. 12A is a side sectional view through the flame arrestor, taken along line 12A—12A in FIG. 9.

Furthermore, a flame arrester 78 is mounted within air inlet opening 16 to extinguish burning sparks and prevent them from burning holes through the filter cartridge side wall 51. Flame arrestor 78 includes an inlet conduit 80 (FIGS. 7 and 12) extending through air inlet opening 16 and a housing 82 within the filter compartment 20 defining a multi-baffled chamber 84. Chamber 84 includes a plurality of spaced apart generally parallel baffles 86 (FIG. 12) extending from opposite sides of housing 82 in substantially overlapped relation so that air flow through the housing experiences multiple collisions and direction changes which operate to extinguish sparks in the air flow. The interiormost baffle and housing further define a final discharge passage 88 which terminates in an air discharge opening 90. Air is directed through the final discharge passage 88 generally tangentially of the filter and is likewise discharged generally at the angle indicated by arrow 92 in FIGS. 7 and 12 tangentially of the filter to effect centrifugal air flow around the filter 40.

The flow lines in FIG. 7 illustrate the multiple collisions of particles carried in the air stream with the filter compartment peripheral side walls. As a result, much of the dust and other pollutants carried by the weld smoke are separated from the air flow and fall downwardly by gravity out of the air stream without ever impinging upon the filter cartridge 40.

To clean the flame arrestor 78, there is provided a flame arrestor blowdown apparatus which includes an injector conduit 94 as shown best in FIGS. 3-5 and 12, which conduit has a discharge end 96 disposed within the flame arrestor at the end of a bent end portion directed axially of the flame arrestor inlet conduit 80 for directing pressurized air through the flame arrestor and blowing that air and any foreign matter lodged within the flame arrestor into the filter compartment 20. The inlet end 98 of injector conduit 94 is arranged exteriorly of housing 12 and may be provided with a quick disconnect fitting 100 for ready connection to a source of pressurized air, which may be commonly referred to as factory air. A valve 102 operated by a handle 104 may be provided on the injector conduit 94 for controlling the flow of pressurized air therethrough. It is generally the initial blast of air through the flame arrestor that is effective for cleaning it.

To minimize adhesion of dust or other foreign matter to the tubular filter cartridge 40, it is helpful to apply a conventional precoat material to the exterior surface of the filter cartridge. To facilitate uniform coating of the entire filter cartridge surface, the present invention provides an upright elongated precoat feed conduit 106 (FIGS. 7 and 9) arranged within the filter compartment behind one of the vertically extended corner gussets 108 which are installed to facilitate centrifugal air movement around the filter cartridge within the compartment 20. The precoat feed conduit 106 has a plurality of vertically spaced apart outlet ports 110, three in the illustrated embodiment, which outlet ports are arranged in communication with the interior of the filter compartment 20 and face the filter cartridge 40. The inlet end 112 (FIGS. 3, 5, and 7) is arranged exteriorly of the filter compartment 20 such that upon immersion of the inlet end in a container of precoat material, vacuum pressure from the vacuum source 66 is operative to draw precoat material through the conduit 106 and outlet ports 110 toward filter cartridge 40 at a plurality of vertically spaced positions thereon.

To enable uniform coating of the filter cartridge 40 throughout the vertical extent thereof, it is preferred that the outlet ports 110 be of decreasing dimension from top to bottom. For example the upper most outlet port may have a diameter of $\frac{1}{2}"$ whereas the middle and bottom outlet ports may have inside diameters of $\frac{3}{8}"$ and $\frac{1}{4}"$, respectively. To facilitate fabrication, the outlet ports may be of uniform dimension, but may receive bushings adapted for securement therein which have inside diameters of decreasing dimension from top to bottom. A removable cap 114 closes the inlet end 112 of the precoat feed conduit 106 when it is not in use.

To prolong the useful life of a given filter cartridge 40, it is desirable to periodically blowdown the filter cartridge to thereby remove build-up of dust and other pollutants on the exterior surface of the cartridge. Such buildup is measured by a draft gauge 113 mounted exteriorly on motor compartment side wall 30, which gauge is connected to pressure sensor lines 115 and 117 (FIG. 5) for sensing the pressure across filter 40. Specifically, line 115 senses the pressure within intermediate chamber 48 and line 117 senses the pressure within the filter compartment 20. When the pressure differential across the filter exceeds a predetermined measurement, such as a two inch water column pressure for example, it is time to blowdown the filter cartridge 40. To accomplish a thorough blowdown of the entire cartridge side wall 51 throughout the vertical extent thereof, the present invention provides a filter compartment blowdown apparatus 116 including an elongated diffuser hose 118 having upper and lower ends. A collar 120 supports the upper end of diffuser hose 118 on the blower base 46, shown in FIG. 8, with the result of the diffuser hose is supported in upright relation in the filter compartment 20 in registration with the top wall air outlet opening 50. The diffuser hose has a plurality of circumferentially and vertically spaced apart outlet ports 122 which are operative to direct air generally radially outwardly through the filter cartridge. The lower end of diffuser hose 118 is closed by a plug 124. Since pressure is concentrated at the closed bottom end of the tube, it is preferred that the outlet ports 122 are of decreasing dimension from top to bottom. For example, an upper series of outlet ports may have a diameter of $\frac{3}{8}"$ whereas a middle group of outlet ports may have a diameter of $\frac{1}{4}"$ with the lowermost outlet ports having a diameter of 3/16". This tends to equalize the radially outward blasts of air from all of the outlet ports when pressurized air is directed into the diffuser hose 118.

The upper end of diffuser hose 118 is connected to a diffuser hose feed conduit 126 (FIGS. 6, 8 and 10) the opposite inlet end of which is connected to a three-port, two position valve 128 having a push bottom actuator 130 protruding through motor compartment side wall 30. A pressurized air tank 132 is mounted within motor compartment 42 and connected by a conduit 134 to valve 128. Finally, an air tank charging conduit 136 extends from valve 128 exteriorly of motor compartment 42 and terminates at a fitting 138 (FIGS. 4 and 8) adapted for connection to a source of pressurized air. A check valve 140 is disposed along the air tank charging conduit 136 for limiting fluid flow to the direction toward valve 128. Finally, an air pressure gauge 142 on charging conduit 136 provides an exteriorly readable indication of the pressure within air tank 132. Valve 128 is spring biased to a position establishing communication between the air tank and check valve 140 and pressure gauge 142. Upon depressing actuator 130 into valve 128, communication is established between the air tank 132 and the diffuser hose feed conduit 126 for directing a blast of pressurized air downwardly through the diffuser hose 118.

Figure 5:
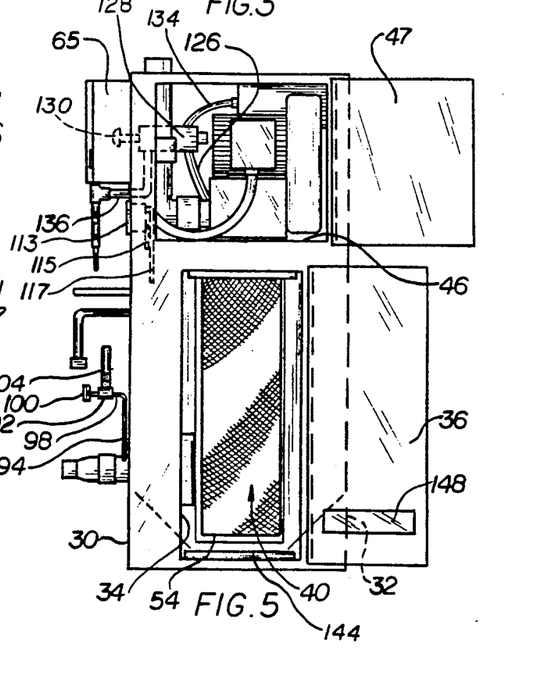
FIG. 5 is a front view of the air cleaner with access doors to the motor and filter compartments open to expose internal elements thereof.

Emptying of collected dust and other pollutants from the filter compartment 20 may be accomplished by providing a removable dust collection pan 144 (FIG. 9) which is supported in the filter compartment 20 below filter cartridge 40 on bottom wall 24 in the illustrated embodiment. The pan extends substantially across the depth of the filter compartment from front to back as illustrated in FIG. 9 but is narrower than the filter compartment as shown in FIG. 5 so as to be insertable and removable through the front door opening 34. To direct material into the pan 144, side walls 30 and 32 have downwardly and interiorly inclined baffles adjacent the lower ends thereof, which baffles overlap the pan 144 to assure that particles sliding down the baffles are directed into the pan. Likewise, door 36 and rear wall 28 are provided with respective downwardly and interiorly inclined baffles 148 and 150 as shown in FIG. 9.

An alternative dust removal system is illustrated in FIGS. 15-18 wherein the filter compartment bottom wall 24 is replaced by a hopper baffle 152 having downwardly and interiorly inclined wall portions converging toward a discharge opening 154. A transversely directed elongated generally tubular eductor 156 is arranged below filter compartment 20 and has a dust inlet opening 158 in communication with the hopper baffle discharge 154. The inlet end of eductor 156 is provided with a fitting 160 for connection to a source of pressurized air and a valve 162 for controlling air flow through the eductor. The opposite outlet end 162 of eductor 156 is adapted for connection to a hose 164 connected to the inlet port 166 of a separator tank 168 for pneumatic conveyance of dust from the eductor to the separator tank with no manual contact with the dust or pollutants. The separator tank 168 preferably has a removable top wall 170 which carries both the inlet port 166 and a filter tower 172 having an outlet opening 174 through the top thereof and a filter cartridge 176 to prevent the escape of pollutants through outlet 174.

Figure 13:
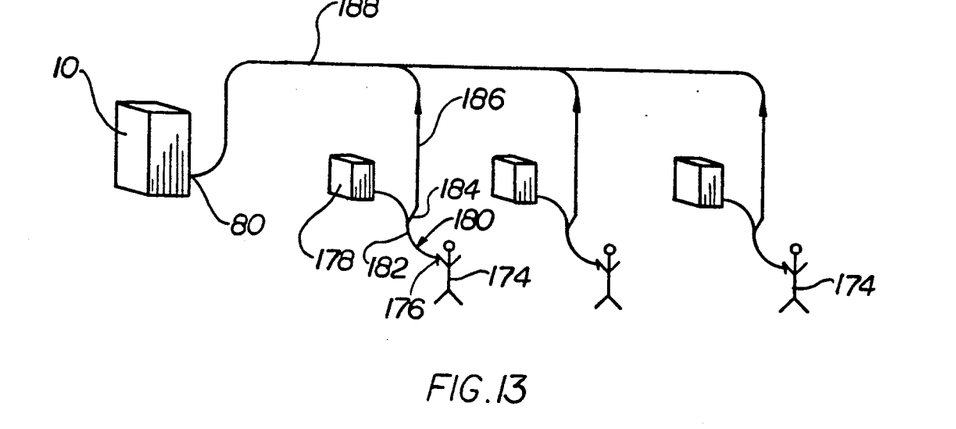
FIG. 13 is a diagrammatic view showing a plurality of welders with their fume extractor hoses connected to a single trunk line connected to the air inlet opening of the air cleaner.
Figure 14:
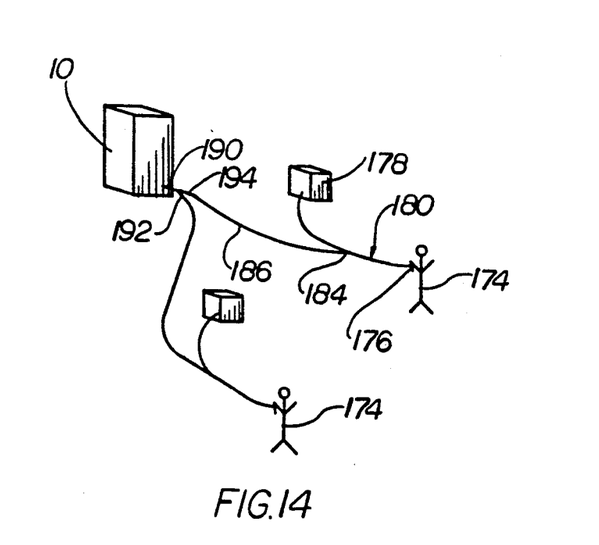
FIG. 14 is a diagrammatic view showing a pair of welders with their fume extractor hoses jointly connected to the air inlet opening of the air cleaner.
Figure 15:
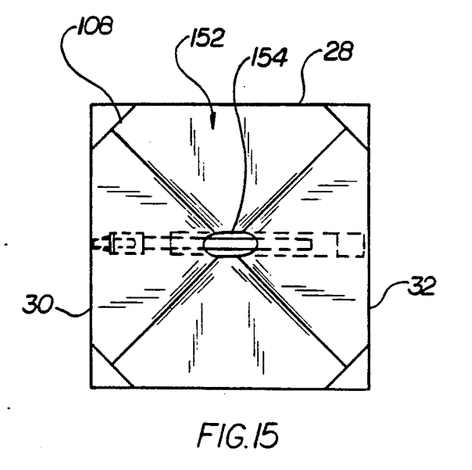
FIG. 15 is a top view of the hopper baffle forming the bottom wall of the filter compartment of an alternate embodiment of the invention.
Figure 16:
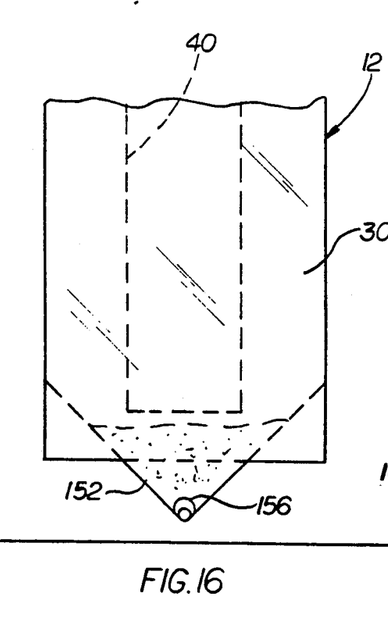
FIG. 16 is a side view of the housing and hopper baffle of FIG. 15.
Figure 17:
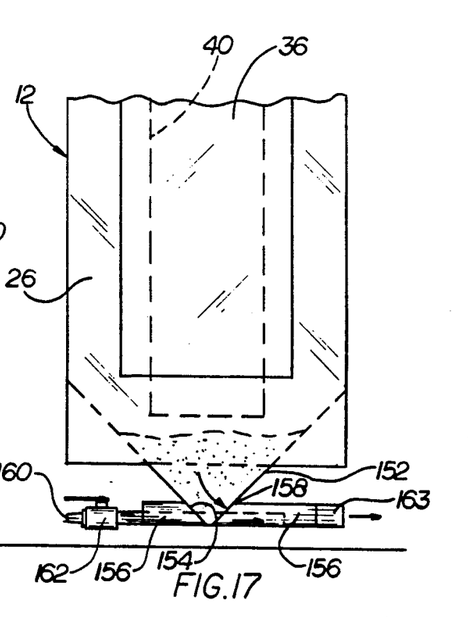
FIG. 17 is a front view of the hopper baffle and tubular eductor of the hopper baffle of FIG. 15.
Figure 18:
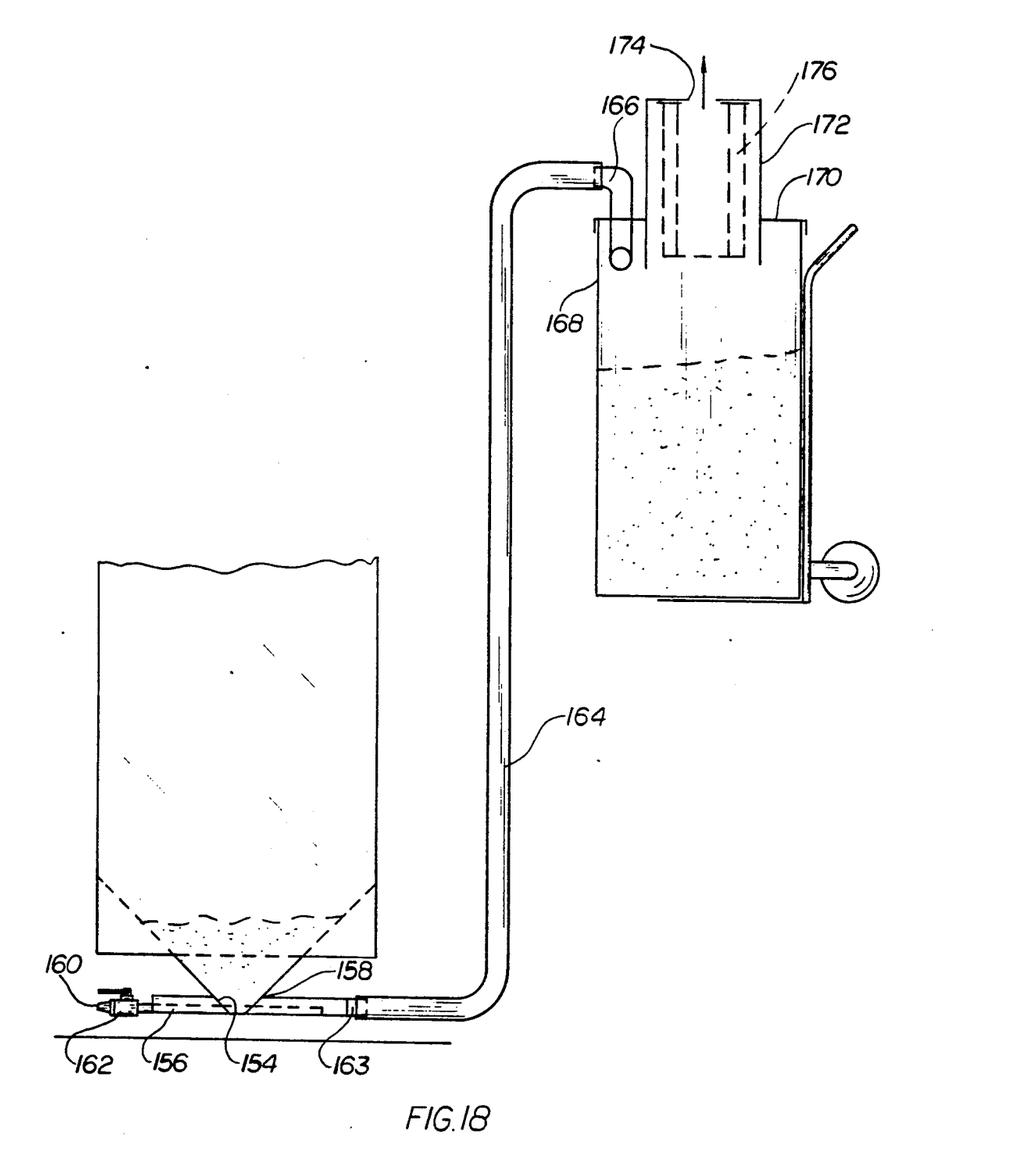
FIG. 18 is a partial front view of the dust removal eductor connected to a separate portable separator tank.

Use of the centrifugal air cleaning apparatus 10 in an industrial welding environment is illustrated in FIGS. 13 and 14. In FIG. 13, each of a plurality of welders 174 is equipped with a welding torch 176 connected to a conventional welding machine 178 by a line 180 which includes an integral fume extractor surrounding an internal wire feed mechanism, which fume extractor 182 terminates at an angled port 184 for connection to suction. Port 184 is connected by a suction hose 186 to a main trunk line 188 connected to the flame arrestor inlet conduit 80 of air inlet opening 16 of the centrifugal air cleaning apparatus 10. Whereas FIG. 13 shows three welders connected to trunk line 188, more or less welders may have equipment connected to the trunk line, as needed.

FIG. 14 illustrates an arrangement wherein a pair of welders 174 have suction hoses leading to a split coupling 190 of the type illustrated in FIG. 7 having a pair of inlet ports 192 and 194 for direct connection to the suction hoses from each of the two welders.

The centrifugal air cleaner 10 of the invention is useful for extracting pollutants from a gas stream in environments other than welding. For example, industrial operations for grinding fiberglass, plastics and metals all produce air flow or fumes carrying pollutants to be filtered before that air flow is released t the ambient air. Similarly, the cutting of rubber hose and even the cutting of certain hardwoods produces obnoxious or toxic fumes to be filtered. In this connection, references to air flow and fumes are intended to refer to whatever gaseous stream is to be filtered.

Whereas the invention has been shown in connection with preferred embodiments thereof, it is understood that many modifications, substitutions and additions may be made which are within the intended broad scope of the appended claims. Whereas it is preferred that the filter housing be oriented such that the axis of the filter cartridge is vertically disposed for most efficient gravitational separation of dust from the centrifugal air flow around the cartridge, the filter compartment could be turned on its side in certain applications whereupon the top and bottom walls would comprise opposite end walls.

Whereas the pressurized air tank within the motor compartment is desirable so that the air cleaner has a self contained source of pressurized air for filter cartridge blowdown, a simplified version could simply have the diffuser hose connected to an exteriorly accessible fitting for connection to factory air. The precoat feed conduit need not necessarily be mounted behind the filter housing corner baffle 108 but is preferably spaced from the filter cartridge by a distance such that the discharge of precoat material therefrom is uniformly distributed along the height of the filter cartridge. The shape of the flame arrestor may be varied substantially. It is simply important to provide multiple directional changes for the air flow therethrough and discharge of air from the flame arrestor generally tangentially to the filter cartridge to set up the centrifugal air flow within the filter compartment.

Furthermore, a filter such as a HEPA filter could be mounted on the air outlet 18 for additional final filtering.

Thus there has been shown and described an improved centrifugal air cleaning apparatus which accomplishes at least all of the stated objects.

I claim:

1. A centrifugal air cleaning apparatus, comprising,
    a housing defining a filter compartment including opposite end walls, and peripheral side walls connected to and extending between said opposite end walls, one end wall having an air outlet opening generally centered thereon,
    a vacuum source,
    fluid passage means establishing communication between said vacuum source and air outlet opening,
    a generally tubular filter cartridge having a closed bottom end and an open upper end,
    means for mounting said filter cartridge in said filter compartment with said open upper end connected to said air outlet opening so that air flow from said open upper end of the filter is directed through said air outlet opening,
    an air inlet opening through one of said peripheral side walls, and
    a flame arrestor operatively associated with said air inlet opening, such that air flow through said air inlet opening is directed through said flame arrestor,
    said flame arrestor including a plurality of flow diverting surfaces for extinguishing sparks in air passing therethrough, said flame arrestor being operative to direct air into said filter compartment generally tangentially of said filter cartridge thereby to effect centrifugal air flow within said filter compartment.

2. The centrifugal air cleaning apparatus of claim 1 wherein said opposite end walls comprise top and bottom walls and said air outlet opening opens through said top wall.

3. The centrifugal air cleaning apparatus of claim 2 wherein said flame arrestor comprises an inlet conduit extending through said air inlet opening and a housing within said filter compartment defining a multi-baffled chamber.

4. The centrifugal air cleaning apparatus of claim 3 wherein said multi-baffled chamber includes a plurality of spaced apart generally parallel baffles extending from opposite sides of said flame arrestor housing in overlapped relation.

5. The centrifugal air cleaning apparatus of claim 4 wherein said baffles and housing define a final discharge passage, having opposite inlet and discharge ends, through which air is directed generally tangentially of said filter and an air discharge opening at the discharge end of said final discharge passage.

6. The centrifugal air cleaning apparatus of claim 1 further comprising flame arrestor blowdown apparatus comprising an injector conduit having an inlet end adapted for connection to a source of pressurized air and a discharge end disposed within said flame arrestor for directing pressurized air therethrough and into said filter compartment.

7. The centrifugal air cleaning apparatus of claim 6 wherein said inlet end of said injector conduit is arranged exteriorly of said housing for ready access.

8. The centrifugal air cleaning apparatus of claim 7 further comprising valve means in said injector conduit.

9. The centrifugal air cleaning apparatus of claim 8 further comprising a quick disconnect fitting on the inlet end of said injector conduit for connection to a source of pressurized air.

10. The centrifugal air cleaning apparatus of claim 2 further comprising,
a filter cartridge blowdown apparatus including an elongated diffuser hose having upper and lower ends, means for supporting said diffuser hose in upright relation in said filter compartment in registration with said top wall air outlet opening, said diffuser hose having a plurality of circumferentially and vertically spaced apart outlet ports therethrough, and means for disengageably connecting the upper end of said diffuser hose to a source of pressurized air for directing blasts of air generally radially outwardly from said outlet ports to blowdown said filter cartridge.

11. The centrifugal air cleaning apparatus of claim 10 further comprising,
an elongated precoat feed conduit having an open inlet and a plurality of spaced apart outlet ports, means for supporting said precoat feed conduit in generally upright relation adjacent said filter compartment side wall with said outlet ports in communication with the interior of said filter compartment,
said inlet end being arranged exteriorly of the filter compartment such that upon immersion of said inlet end in precoat material, vacuum pressure from said vacuum source is operative to draw precoat material through said conduit and outlet ports toward said filter cartridge at a plurality of vertically spaced apart positions thereon.

12. The centrifugal air cleaning apparatus of claim 11 further comprising flame arrestor blowdown apparatus comprising an injector conduit having an inlet end adapted for connection to a source of pressurized air and a discharge end disposed within said flame arrestor for directing pressurized air therethrough and into said filter compartment.

13. The centrifugal air cleaning apparatus of claim 12 further comprising,
a dust collection pan,
means for supporting said dust collection pan in said filter compartment below said filter cartridge, and
baffle means on said filter compartment peripheral side walls extending downwardly and interiorly therefrom so as to direct dust falling by gravity in said filter compartment into said dust collection pan.

14. The centrifugal air cleaning apparatus of claim 12 further comprising,
said bottom of said filter compartment comprising a hopper baffle including downwardly and interiorly inclined wall portions converging toward a discharge opening and further comprising an elongated generally tubular eductor having inlet and outlet ends and a dust inlet opening intermediate said ends in communication with said hopper baffle discharge opening, means for connecting said inlet end to a source of pressurized air whereby air flow through said eductor is operative to draw dust from said hopper for discharge through said outlet end.

15. The centrifugal air cleaning apparatus of claim 2 wherein said housing further defines a motor compartment above said filter compartment, said vacuum source comprising a vacuum blower motor mounted within said motor compartment, said motor having an air inlet connected to said air outlet opening through the filter compartment top wall and an air outlet in communication with an outlet opening through said motor compartment for discharging air exteriorly of said motor compartment.

16. The centrifugal air cleaning apparatus of claim 15 wherein said motor compartment further comprises a pair of air vent openings to ventilate said motor compartment.

17. The centrifugal air cleaning apparatus of claim 15 wherein said housing further comprises an intermediate chamber between said filter compartment and motor compartment, said air outlet opening through the filter compartment top wall and said motor air inlet being in communication with said intermediate chamber.

18. A centrifugal air cleaning apparatus, comprising,
a housing defining a filter compartment including a top wall, bottom wall and peripheral side walls, said top wall having an air outlet opening generally centered thereon,
a vacuum source,
fluid passage means establishing communication between said vacuum source and air outlet opening,
a generally tubular filter cartridge having a closed bottom end and an open upper end,
means for mounting said filter cartridge in upright relation within said filter compartment with said open upper end connected to said air outlet opening so that fluid flow from said open upper end of the filter is directed through said outlet opening, an air inlet opening through said side wall, means for directing air through said air inlet opening into said filter compartment generally tangentially of said filter cartridge thereby to effect centrifugal air flow within said filter compartment, and an elongated precoat feed conduit having an open inlet and a plurality of spaced apart outlet ports, means for supporting said precoat feed conduit in generally upright relation adjacent said filter compartment side wall with said outlet ports in communication with the interior of said filter compartment, said inlet end being arranged exteriorly of the filter compartment such that upon immersion of said inlet end in precoat material, vacuum pressure from said vacuum source is operative to draw precoat material through said conduit and outlet ports toward said filter cartridge at a plurality of vertically spaced apart positions thereon.

19. The centrifugal air cleaning apparatus of claim 18 wherein said plurality of outlet ports are of decreasing dimension from top to bottom.

20. The centrifugal air cleaning apparatus of claim 19 wherein said outlet ports include openings of uniform dimension and a plurality of bushings adapted for securement within said openings and having inside diameters of decreasing dimension from top to bottom.

21. The centrifugal air cleaning apparatus of claim 20 further comprising a removable cap on the inlet end of said precoat feed conduit.

22. A centrifugal air cleaning apparatus, comprising, a housing defining a filter compartment including a top wall, bottom wall and peripheral side wall, said top wall having an air outlet opening generally centered thereon, a vacuum source, fluid passage means establishing fluid communication between said vacuum source and air outlet opening, a generally tubular filter cartridge having a closed bottom end and an open upper end, means for mounting said filter cartridge in upright relation within said filter compartment with said open upper end connected to said air outlet opening so that flow from said open upper end of the filter is directed through said outlet opening, an air inlet opening through said side wall, means for directing air through said air inlet opening into said filter compartment generally tangentially of said filter cartridge thereby to effect centrifugal air flow within said filter compartment, and a filter cartridge blowdown apparatus including an elongated diffuser hose having upper and lower ends, means for supporting said diffuser hose in upright relation in said filter compartment in registration with said top wall air outlet opening, said diffuser hose having a plurality of circumferentially and vertically spaced apart outlet ports therethrough, and means for disengageably connecting the upper end of said diffuser hose to a source of pressurized air for directing blasts of air generally radially outwardly from said outlet ports to blowdown said filter cartridge.

23. The centrifugal air cleaning apparatus of claim 22 wherein said outlet ports are operative to direct air generally radially outwardly through said filter cartridge.

24. The centrifugal air cleaning apparatus of claim 23 wherein said filter cartridge blowdown apparatus further comprises a diffuser hose feed conduit having inlet and outlet ends, said outlet end being connected to the upper end of the diffuser hose and means for connecting the inlet end to a source of pressurized air.

25. The centrifugal air cleaning apparatus of claim 24 further comprising valve means on said diffuser hose feed conduit.

26. The centrifugal air cleaning apparatus of claim 25 further comprising a pressurized air tank and a conduit for airflow between said tank and said valve means.

27. The centrifugal air cleaning apparatus of claim 26 further comprising an air pressure gauge in fluid communication with said air tank and mounted on said housing so as to be visible exteriorly of said housing.

28. The centrifugal air cleaning apparatus of claim 27 further comprising an air tank charging conduit having an inlet end adapted for connection to a source of pressurized air, an outlet end operatively connected to said pressurized air tank and a check valve disposed along said air tank charging conduit for limiting fluid flow to one direction therethrough.

29. The centrifugal air cleaning apparatus of claim 28 wherein said valve means comprises a three-port two position valve, spring biased to a position blocking fluid flow from said pressurized air tank to said diffuser hose and actuatable to establish fluid flow from said pressurized air tank to said diffuser hose at times.

30. A centrifugal air cleaning apparatus, comprising, a housing defining a filter compartment including a top wall, bottom wall and peripheral side walls, said top wall having an air outlet opening generally centered thereon, a vacuum source, fluid passage means establishing fluid communication between said vacuum source and air outlet opening, a generally tubular filter cartridge having a closed bottom end and an open upper end, means for mounting said filter cartridge in upright relation within said filter compartment with said open upper end connected to said air outlet opening so that fluid flow from said open upper end of the filter is directed through said outlet opening, an air inlet opening through said side wall, and means for directing air through said air inlet opening into said filter compartment generally tangentially of said filter cartridge thereby to effect centrifugal fluid flow within said filter compartment, and a dust collection pan, means for supporting said dust collection pan in said filter compartment below said filter cartridge, and baffle means on said filter compartment peripheral side walls extending downwardly and interiorly therefrom so as to direct dust falling by gravity in said filter compartment into said dust collection pan.

31. The centrifugal air cleaning apparatus of claim 30 further comprising a door through said peripheral side wall, downwardly and interiorly inclined baffle means on said door, and said pan being insertable into and removable from said filter compartment through said door for periodic emptying.

32. A centrifugal air cleaning apparatus, comprising, a housing defining a filter compartment including a top wall, bottom wall and peripheral side walls, said top wall having an air outlet opening generally centered thereon, a vacuum source, fluid passage means establishing fluid communication between said vacuum source and air outlet opening, a generally tubular filter cartridge having a closed bottom end and an open upper end, means for mounting said filter cartridge in upright relation within said filter compartment with said open upper end connected to said air outlet opening so that fluid flow from said open upper end of the filter is directed through said outlet opening, an air inlet opening through said side wall, and means for directing air through said air inlet opening into said filter compartment generally tangentially of said filter cartridge thereby to effect centrifugal fluid flow within said filter compartment, and said bottom of said filter compartment comprising a hopper baffle including downwardly and interiorly inclined wall portions converging toward a discharge opening and further comprising an elongated generally tubular eductor having inlet and outlet ends and a dust inlet opening intermediate said ends in communication with said hopper baffle discharge opening, means for connecting said inlet end to a source of pressurized air whereby air flow through said eductor is operative to draw dust from said hopper for discharge through said outlet end.

33. The centrifugal air cleaning apparatus of claim 32 further comprising a separator tank including a removable top wall having inlet and outlet openings therethrough, filter means covering said outlet opening and an elongated hose having an inlet end adapted for connection to the outlet end of said eductor and an outlet end adapted for connection to the inlet opening of said separator tank for pneumatic conveyance of dust from said eductor to said separator tank.

* * * * *